United States Patent
Tachikawa

(10) Patent No.: US 8,208,902 B2
(45) Date of Patent: Jun. 26, 2012

(54) COMMUNICATION SYSTEM, AUTHENTICATION SERVER, AND COMMUNICATION METHOD

(75) Inventor: Hitoya Tachikawa, Yokohama (JP)

(73) Assignee: Kyocera Corporation, Kyoto (JP)

( * ) Notice: Subject to any disclaimer, the term of this patent is extended or adjusted under 35 U.S.C. 154(b) by 410 days.

(21) Appl. No.: 12/512,916

(22) Filed: Jul. 30, 2009

(65) Prior Publication Data

US 2010/0184407 A1   Jul. 22, 2010

(30) Foreign Application Priority Data

Jul. 30, 2008   (JP) ................................ 2008-196109

(51) Int. Cl.
  *H04M 1/66* (2006.01)
(52) U.S. Cl. ........ 455/411; 455/436; 370/331; 370/338; 713/168; 713/169; 713/170
(58) Field of Classification Search .................. 455/436, 455/411; 370/331, 338; 713/168, 169, 170
  See application file for complete search history.

(56) References Cited

U.S. PATENT DOCUMENTS 7,158,777 B2 * 1/2007 Lee et al. ...................... 455/411
2004/0240411 A1 * 12/2004 Suzuki .......................... 370/331

FOREIGN PATENT DOCUMENTS

JP      4000933      10/2007
JP      2008-015696   1/2008

OTHER PUBLICATIONS

Office Action from Japanese Patent Application No. 2008-196109, mailed on Jul. 27, 2010.

* cited by examiner

*Primary Examiner* — Kamran Afshar
*Assistant Examiner* — Manpreet Matharu
(74) *Attorney, Agent, or Firm* — Morrison & Foerster LLP

(57) ABSTRACT

An authentication server according to the present invention performs authentication of a first access to the Internet via a base station, and stores a usable base station identifier identifying a radio base station usable by the radio terminal to access the Internet. When a base station identifier of a different base station being a handover candidate of the radio terminal matches the usable base station identifier stored in advance, the authentication server transmits an authentication request to an authentication server managing the different base station, the authentication request requesting authentication of a second access to the Internet via the different base station.

8 Claims, 5 Drawing Sheets

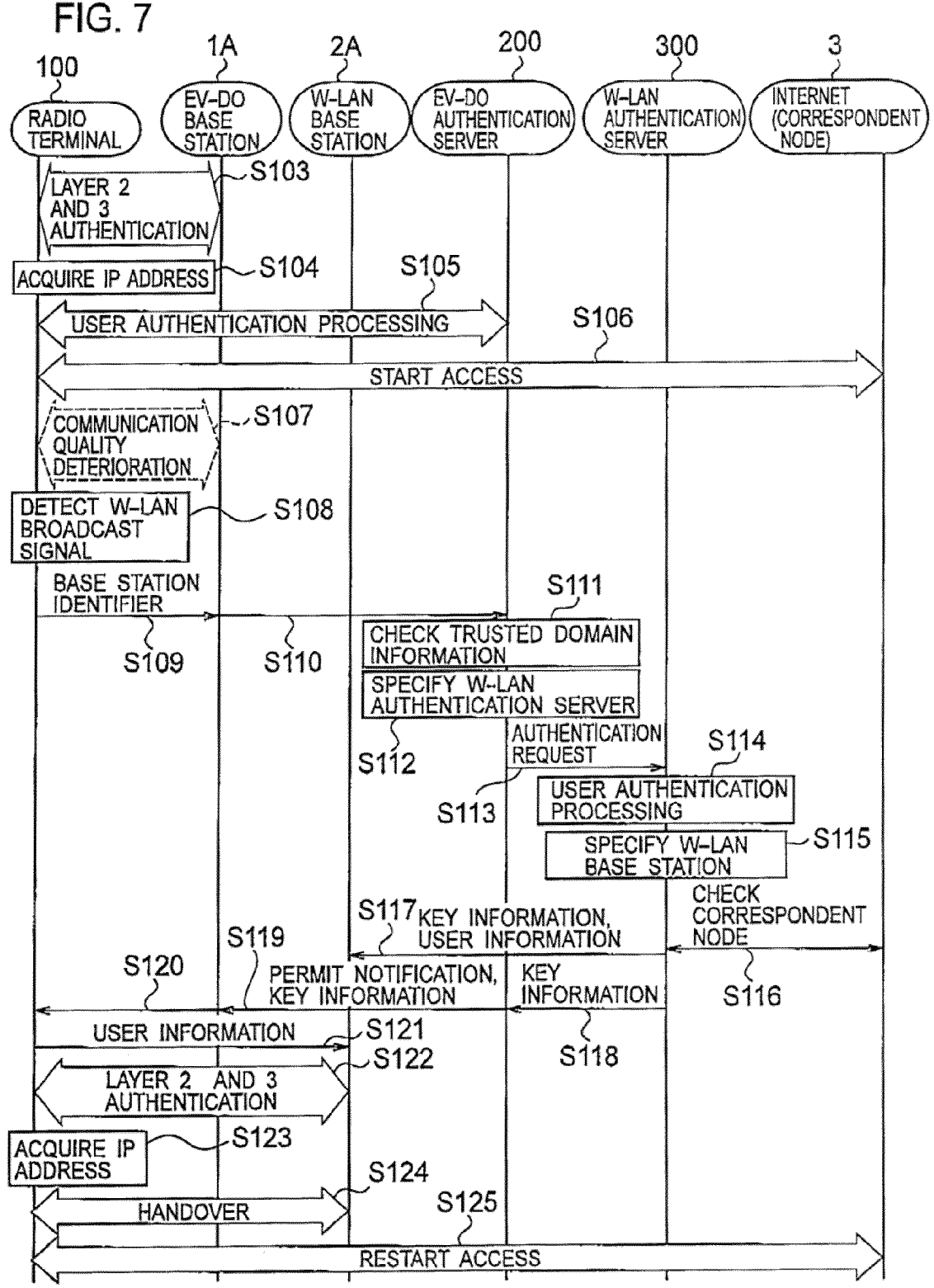

COMMUNICATION SYSTEM, AUTHENTICATION SERVER, AND COMMUNICATION METHOD

CROSS REFERENCE TO RELATED APPLICATION

This application is based upon and claims the benefit of priority from the prior Japanese Patent Applications No. 2008-196109 filed on Jul. 30, 2008; the entire contents of which are incorporated herein by reference.

BACKGROUND OF THE INVENTION

1. Field of the Invention

The present invention relates to a communication system, an authentication server, and a communication method for performing authentication of an access to a communication network via a radio base station.

2. Description of the Related Art

Generally, in a communication system in which a radio terminal accesses a communication network, such as the Internet, via a radio base station, an authentication server is provided to perform authentication of the access of the radio terminal to the communication network. When the authentication server permits the access to the communication network, the radio terminal can access the communication network.

In such a communication system, the authentication server manages authentication of the radio base station or of the overall radio communication system including the radio base station. A "management domain" is used below as appropriate to indicate a target (a radio base station or a radio communication system) to be managed for the authentication by a single authentication server.

During access to the communication network, the radio terminal performs handover for switching and connecting to a radio base station having better conditions. The handover is performed not only within the same management domain, but across different management domains in some cases.

When performing handover across different management domains, the radio terminal needs to perform authentication processing with an authentication server corresponding to a management domain being a handover destination. Specifically, after connected to the handover destination management domain, the radio terminal performs the authentication processing with the corresponding authentication server. Then, when the authentication server permits an access of the radio terminal to the communication network, the radio terminal can start access to the communication network (see, for example, Japanese Patent No. 4000933).

However, the following problems arise in handover performed across different management domains. Specifically, when performing handover from one management domain to a different management domain, the radio terminal is not always permitted to access the communication network in the different management domain, that is a handover destination. Accordingly, when the destination management domain is not usable by the radio terminal to access the communication network, the radio terminal is rejected for access to the communication network via the destination management domain, and so fails to access the communication network.

In addition, in handover across different management domains, the radio terminal cannot start access to the communication network between the time when the radio terminal is connected to the destination management domain and the time when the radio terminal is permitted to start access to the communication network by an authentication server corresponding to the destination management domain. Accordingly, handover performed across different management domains has a problem of requiring a long time between the time when the radio terminal is connected to the destination management domain and the time when the radio terminal is allowed to start access to the communication network.

SUMMARY OF THE INVENTION

The present invention has been made in consideration of the above problems, and an objective of the present invention is to provide a communication system, an authentication server, and a communication method, which, in a case where a radio terminal performs handover across different management domains, guarantee the radio terminal to maintain access to a communication network continuously via a destination management domain, and allow the radio terminal to start access to the communication network immediately after the handover.

The present invention has the following characteristics to solve the problems described above. First of all, a characteristic of a communication system according to the present invention is summarized as a communication system (communication system 10) comprising: a radio terminal (radio terminal 100) configured to perform handover from a first radio base station (EV-DO base station 1A) to a second radio base station (W-LAN base station 2A); a first authentication server (EV-DO authentication server 200) configured to perform authentication of a first access to a communication network (Internet 3) via the first radio base station; and a second authentication server (W-LAN authentication server 300) configured to perform authentication of a second access to the communication network via the second radio base station, wherein upon detection of a radio signal including a base station identifier identifying the second radio base station during the first access, the radio terminal notifies the first authentication server of the base station identifier, the first authentication server includes: a storage unit (trusted domain information storage unit 222) configured to store a usable base station identifier identifying a usable base station which is a radio base station usable by the radio terminal to access the communication network; a request transmitter (wired communication unit 211) configured to transmit, to the second authentication server, an authentication request requesting authentication of the second access of the radio terminal, when the base station identifier notified by the radio terminal matches the usable base station identifier stored by the storage unit; and a notification transmitter (wired communication unit 211) configured to transmit, to the radio terminal via the first radio base station, a permit notification indicating that the second access is permitted, when the second authentication server permits the second access of the radio terminal in response to the authentication request, wherein upon receipt of the permit notification, the radio terminal performs the handover to the second radio base station and starts the second access.

According to the communication system, during the first access of the radio terminal via the first radio base station, the first authentication server transmits an authentication request to the second authentication server in advance (before the radio terminal performs handover). When the authentication request is permitted, the first authentication server notifies the radio terminal that the second authentication server permits the second access.

Then, upon receipt of the permit notification, the radio terminal performs handover to the second radio base station, and starts the second access. The second access is already permitted by the second authentication server when the radio terminal performs handover. Thereby, the radio terminal can start the second access instantly.

In addition, the first authentication server transmits the authentication request to the second authentication server after confirming that the second radio base station can be used for the second access to the communication network. Accordingly, the radio terminal can be guaranteed to maintain the second access to the communication network continuously via a handover destination (the second radio base station).

In the communication system, the second authentication server transmits, to the first authentication server and the second radio base station, key information used for encryption and decryption in radio communication between the radio terminal and the second radio base station, when the second authentication server receives the authentication request from the first authentication server and permits the second access of the radio terminal, the first authentication server transmits the permit notification and the key information to the radio terminal via the first radio base station, when the first authentication server receives the key information from the second authentication server, and the radio terminal and the second radio base station use the key information to perform the encryption and the decryption.

In the communication system, the radio terminal transmits the base station identifier to the first authentication server when communication quality of radio communication between the radio terminal and the first radio base station has deteriorated to a value lower than a predetermined threshold and when the radio terminal detects the radio signal including the base station identifier.

In the communication system, when the usable base station is added or deleted, the storage unit stores again usable base station identifiers identifying usable base stations after the addition or the deletion.

In the communication system, the first radio base station is included in a first radio communication system (EV-DO system 1) provided by a predetermined service provider, and the second radio base station is included in a second radio communication system (W-LAN system 2) provided by a service provider different from the predetermined service provider.

In the communication system, the first radio communication system is configured in conformity with a predetermined radio communication scheme, and the second radio communication system is configured in conformity with a radio communication scheme different from the predetermined radio communication scheme.

A characteristic of an authentication server according to the present invention is summarized as an authentication server (EV-DO authentication server 200) configured to perform authentication of a first access to a communication network (Internet 3) via a first radio base station (EV-DO base station 1A), the authentication server comprising: a storage unit (trusted domain information storage unit 222) configured to store a usable base station identifier identifying a usable base station which is a radio base station usable by a radio terminal to access the communication network, the radio terminal performing handover from the first radio base station; a request transmitter (wired communication unit 211) configured to transmit an authentication request to a different authentication server managing a second radio base station, when a base station identifier identifying the second radio base station notified by the radio terminal as a handover candidate matches the usable base station identifier stored by the storage unit, the authentication request requesting authentication of a second access to the communication network via the second radio base station; and a notification transmitter (wired communication unit 211) configured to transmit a permit notification to the radio terminal via the first radio base station, when the different authentication server permits the second access of the radio terminal in response to the authentication request, the permit notification indicating that the second access is permitted.

A characteristic of a communication method according to the present invention is summarized as a communication method used for a communication system including: a radio terminal configured to perform handover from a first radio base station to a second radio base station; a first authentication server configured to perform authentication of a first access to a communication network via the first radio base station; and a second authentication server configured to perform authentication of a second access to the communication network via the second radio base station, the method comprising the steps of: storing (Step S102a), at the first authentication server, a usable base station identifier identifying a usable base station which is a radio base station usable by the radio terminal to access the communication network; notifying (Step S109), at the radio terminal, the first authentication server of a base station identifier upon detection of a radio signal including the base station identifier identifying the second radio base station during the first access; transmitting (Step S113), at the first authentication server, an authentication request to the second authentication server when the base station identifier notified by the step of notifying matches the usable base station identifier stored by the step of storing, the authentication request requesting authentication of the second access of the radio terminal; transmitting (Steps S119, S120), at the first authentication server, a permit notification to the radio terminal via the first radio base station when the second authentication server permits the second access of the radio terminal in response to the authentication request, the permit notification indicating that the second access is permitted; and performing (Step S124, S125), at the radio terminal, handover to the second radio base station upon receipt of the permit notification and starting the second access.

According to the present invention, it is possible to provide a communication system, an authentication server, a communication method, which, in a case where a radio terminal performs handover across different management domains, guarantee the radio terminal to maintain access to a communication network continuously via a destination management domain, and allow the radio terminal to start access to the communication network immediately after the handover.

BRIEF DESCRIPTION OF THE DRAWINGS

FIG. 7 is a sequence diagram showing an operation of handover according to the embodiment of the present invention.

DESCRIPTION OF THE PREFERRED EMBODIMENTS

Figure 1:
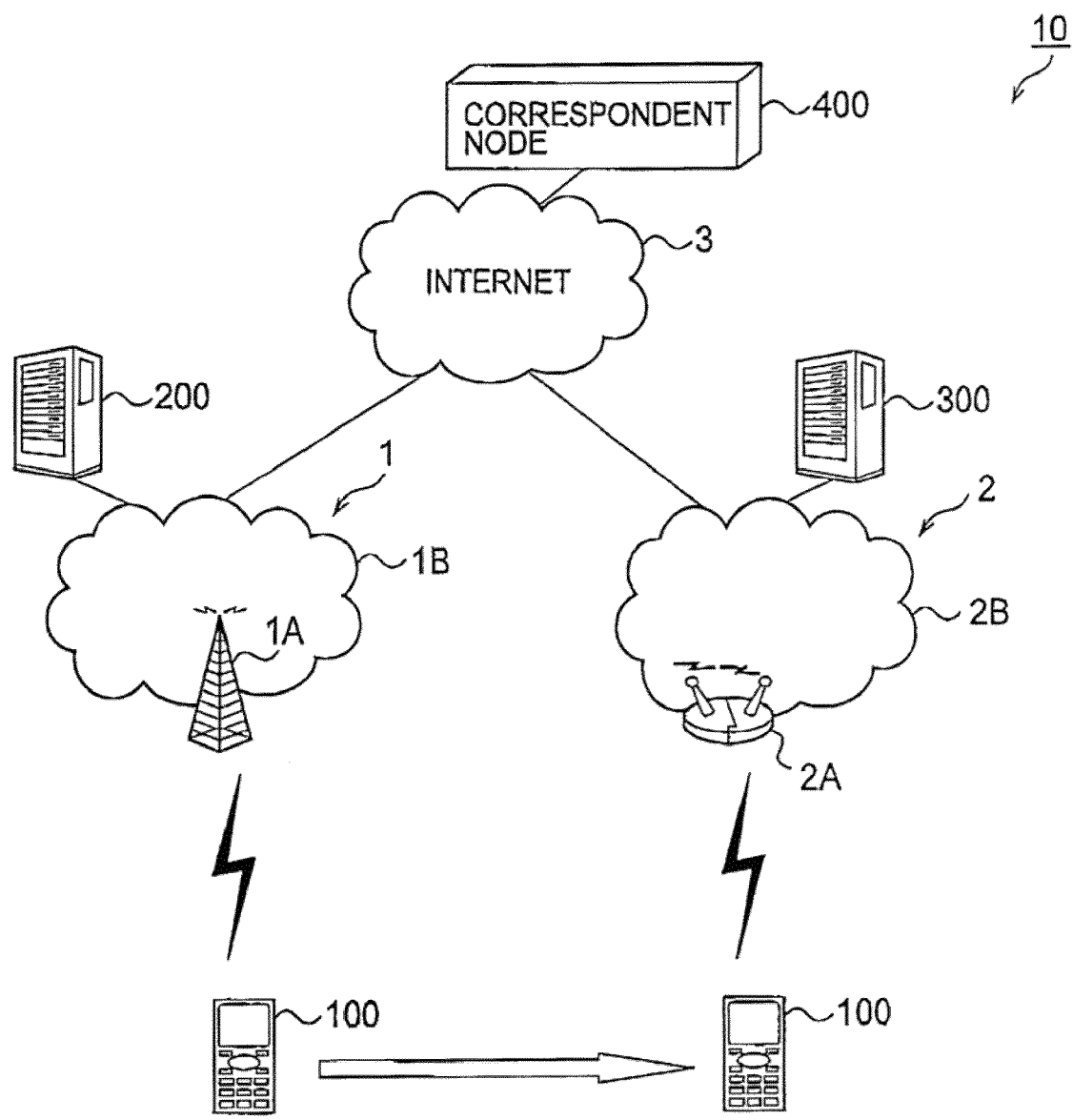
FIG. 1 is a diagram showing the overall configuration of a communication system according to an embodiment of the present invention.

Next, referring to the drawings, descriptions will be given of communication systems according to embodiments of the present invention. Specifically, the following descriptions will be given of: (1) Overall Configuration of the Communication System, (2) Detailed Configuration of the Communication System, (3) Operations of the Communication System, (4) Advantageous Effects, and (5) Other Embodiments. In the embodiments, the same or like reference numerals are used throughout the drawings to refer to the same or like parts.

(1) Overall Configuration of the Communication System

FIG. 1 is a diagram showing the overall configuration of a communication system 10 according to the present embodiment.

In the present embodiment, a radio terminal 100 has a configuration connectable to any of the multiple radio communication systems employing different radio communication schemes (different configurations of the physical layer and the link layer). As the user of the radio terminal 100 moves, the radio terminal 100 performs handover from an EV-DO system 1 to a W-LAN system 2. The EV-DO system 1 conforms to cdma2000 1x-EVDO (called "EV-DO" below), and the W-LAN system 2 conforms to a scheme of a wireless local area network (called "W-LAN" below) such as IEEE802.11.

The EV-DO system 1 is a third-generation cellular phone system employing the CDMA scheme, and is capable of IP packet communications. The EV-DO system 1 includes an EV-DO base station 1A (first radio base station) and a backbone network 1B.

The EV-DO base station 1A is configured in conformity with EV-DO and performs radio communication with the radio terminal 100. Although FIG. 1 shows only one EV-DO base station 1A, a number of EV-DO base stations 1A are actually set up. At predetermined intervals, the EV-DO base station 1A transmits broadcast signals (radio signals) each including a base station identifier (specifically, a BSID) identifying the EV-DO base station 1A.

The backbone network 1B is a wired communication network configured of an IP router and the like, and is connected in a wired manner to the Internet 3 (communication network). An EV-DO authentication server 200 (first authentication server) is connected to the backbone network 1B. The EV-DO authentication server 200 is configured to perform authentication of an access of the radio terminal 100 to the Internet 3 via the EV-DO base station 1A (called a "first access" below as appropriate). For example, the EV-DO authentication server 200 is configured as a RADIUS server.

Like the EV-DO system 1, the W-LAN system 2 is capable of IP packet communications, and is capable of performing radio communication with the radio terminal 100 at speed higher than EV-DO. The W-LAN system 2 includes a W-LAN base station 2A (second radio base station) and a backbone network 2B. Although FIG. 1 shows only one W-LAN base station 2A, a number of W-LAN base stations 2A are actually set up. At predetermined intervals, the W-LAN base station 2A transmits beacon signals (radio signals) each including a base station identifier (specifically, a MAC address) identifying the W-LAN base station 2A.

The backbone network 2B is a wired communication network configured of an IP router and the like, and is connected to the Internet 3 (communication network). A W-LAN authentication server 300 (second authentication server) is connected to the backbone network 2B. The W-LAN authentication server 300 performs authentication of an access of the radio terminal 100 to the Internet 3 via the W-LAN base station 2A (called a "second access" below as appropriate). For example, the W-LAN authentication server 300 is configured as a RADIUS server, like the EV-DO authentication server 200.

A correspondent node 400 being a communication partner of the radio terminal 100 is connected to the Internet 3. The correspondent node 400 transmits and receives IP packets to and from the radio terminal 100 via the Internet 3.

The EV-DO system 1 and the W-LAN system 2 are provided by different service providers. Specifically, each of the service providers is an Internet service provider (ISP) that provides an Internet connection service that allows the radio terminal 100 to access the Internet 3.

In the present embodiment, the EV-DO system 1 and the W-LAN system 2 can be used mutually. Specifically, a radio terminal (user) having subscribed to a service provider proving the EV-DO system 1 can access the Internet 3 by using the W-LAN system 2. Likewise, a radio terminal (user) having subscribed to a service provider proving the W-LAN system 2 can access the Internet 3 by using the EV-DO system 1.

Here, a high-security IP communication by IPSec is used for communications between the radio terminal 100 and the EV-DO authentication server 200, between the EV-DO authentication server 200 and the W-LAN authentication server 300.

In the present embodiment, an example is described in which the radio terminal 100 transmitting and receiving IP packets to and from the correspondent node 400 by using the EV-DO system 1 cannot obtain desired communication quality (such as RSSI or SNR) from the EV-DO base station 1A and therefore performs handover from the EV-DO base station 1A to the W-LAN base station 2A.

To perform handover from the EV-DO base station 1A to the W-LAN base station 2A, the radio terminal 100 connects to the W-LAN base station 2A. Specifically, the radio terminal 100 first performs handover at the link layer (layer 2) level (called link-layer handover below) by establishing a radio link with the W-LAN base station 2A and disconnecting a radio link with the EV-DO base station 1A. After completion of the link-layer handover, the radio terminal 100 acquires a new IP address from the W-LAN system 2 and thereby performs handover at the IP layer (layer 3) level (called IP-layer handover below). Note that the communication system 10 may use an IP mobility protocol, such as a mobile IP, to allow continuous IP packet communication without disconnection while handover is performed from the EV-DO system 1 to the W-LAN system 2.

(2) Detailed Configuration of the Communication System

Next, the detail configuration of the communication system 10 will be given in the order of: (2. 1) Configuration of Radio Terminal, (2. 2) Configuration of EV-DO Authentication Server, and (2. 3) Configuration of W-LAN Authentication Server.

(2. 1) Configuration of the Radio Terminal

Figure 2:
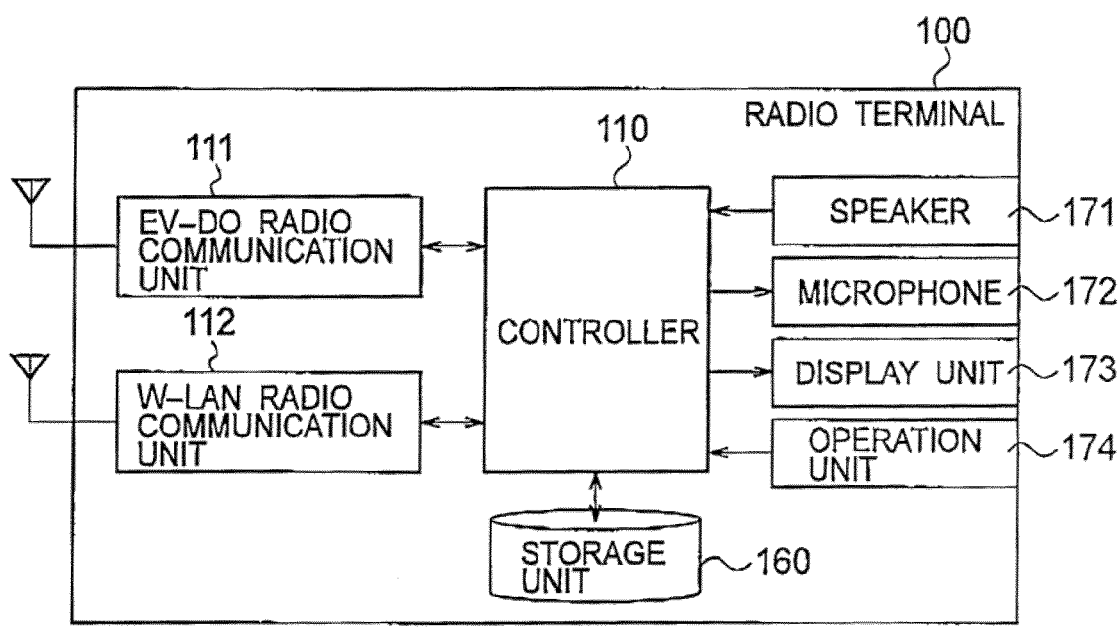
FIG. 2 is a block diagram showing the configuration of a radio terminal according to the embodiment of the present invention.

FIG. 2 is a block diagram showing the configuration of the radio terminal 100.

As shown in FIG. 2, the radio terminal 100 includes two different radio communication units. Specifically, the radio terminal 100 includes an EV-DO radio communication unit 111 and a W-LAN radio communication unit 112 to be connected to either the EV-DO system 1 or the W-LAN system 2 to perform radio communication. The EV-DO system 1 and the W-LAN system 2 have different schemes at least at the physical layer. Each of the EV-DO radio communication unit 111 and the W-LAN radio communication unit 112 includes a low noise amplifier (LNA), a power amplifier, an up-converter, a down-converter, and the like, and transmits and receives radio signals.

The radio terminal 100 further includes a controller 110, a storage unit 160, a speaker 171, a microphone 172, a display unit 173, and an operation unit 174.

The controller 110 is configured by, for example, a CPU, and controls various functions of the radio terminal 100. For example, the controller 110 has protocols for implementing media-independent handover that does not depend on the configuration of the physical layer of each of the W-LAN system 2 and the EV-DO system 1, namely, a protocol stack conforming to IEEE802.21, and is configured to control handover between the EV-DO base station 1A and the W-LAN base station 2A.

The controller 110 is configured to monitor the quality (such as RSSI and SNR) of radio signals that the EV-DO radio communication unit 111 or the W-LAN radio communication unit 112 receives from the EV-DO base station 1A or the W-LAN base station 2A, respectively. While the EV-DO radio communication unit 111 is performing radio communication with the EV-DO base station 1A, the controller 110 usually brings down the operations of the W-LAN radio communication unit 112 to cut electric power consumption. Then, when the quality of radio signals received by the EV-DO radio communication unit 111 from the EV-DO base station 1A deteriorates to a value lower than a predetermined threshold, the controller 110 causes the W-LAN radio communication unit 112 to start its operations and to capture a beacon signal transmitted from the W-LAN base station 2A. Further, when the W-LAN radio communication unit 112 detects a beacon signal from the W-LAN base station 2A, the controller 110 extracts a MAC address included in the beacon signal, and then notifies the EV-DO authentication server 200 of the MAC address through the EV-DO radio communication unit 111.

The storage unit 160 is configured by, for example, a memory, and stores various kinds of information used for control or the like in the radio terminal 100. The microphone 172 collects voice, generates voice data from the collected voice, and inputs the voice data to the controller 110 via a voice codec (not shown). The speaker 171 outputs voice based on voice data acquired from the controller 110 via the voice codec (not shown). The display unit 173 displays an image received via the controller 110, operation contents (such as an input telephone number and an input address), and the like. The operation unit 174 is configured by a numeric keypad and function keys, and is used by a user to input operation contents.

(2. 2) Configuration of the EV-DO Authentication Server

Figure 3:
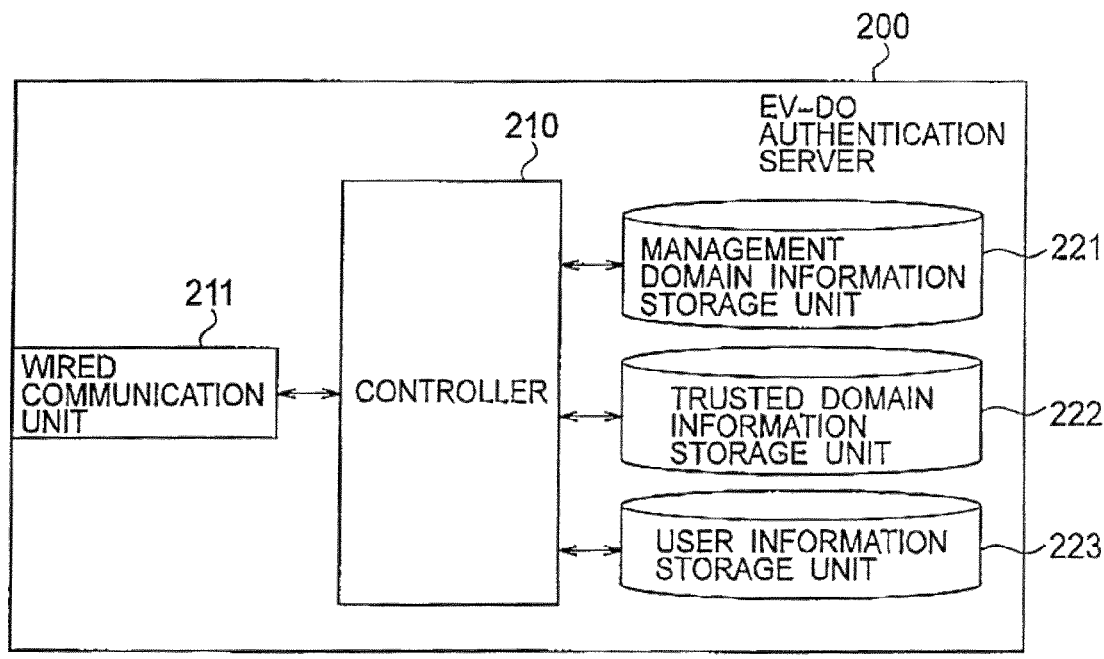
FIG. 3 is a block diagram showing the configuration of an EV-DO authentication server according to the embodiment of the present invention.

FIG. 3 is a block diagram showing the configuration of the EV-DO authentication server 200.

As shown in FIG. 3, the EV-DO authentication server 200 includes a wired communication unit 211, a controller 210, a management domain information storage unit 221, a trusted domain information storage unit 222, and a user information storage unit 223.

The wired communication unit 211 is connected to the backbone network 1B constituting the EV-DO system 1, and is configured to perform wired communication with the EV-DO base station 1A via the backbone network 1B. Further, the wired communication unit 211 is capable of performing wired communication with the W-LAN authentication server 300 and the correspondent node 400 via the backbone network 1B and the Internet 3.

The management domain information storage unit 221 stores management domain information associating the BSID of the EV-DO base station 1A with the IP address. The trusted domain information storage unit 222 stores information on the W-LAN system 2 as trusted-domain information. To give a concrete example, the trusted domain information storage unit 222 stores trusted-domain information including the MAC address of the W-LAN base station 2A, information on a service provider providing the W-LAN system 2, and the IP address of the W-LAN authentication server 300 in association with each other. In other words, in the present embodiment, the trusted domain information storage unit 222 constitutes a storage unit that stores a usable base station identifier (MAC address) in advance identifying a usable base station (W-LAN base station 2A), which is a radio base station that can be used by the radio terminal 100 for the second access to the Internet 3. The user information storage unit 223 stores user information including a user identifier identifying a user who can use the EV-DO system 1.

The controller 210 is configured by, for example, a CPU, and controls various functions of the EV-DO authentication server 200. For example, the controller 210 is configured to determine whether or not the base station identifier (MAC address) of the W-LAN base station 2A notified by the radio terminal 100 via the wired communication unit 211 matches the usable base station identifier stored in the trusted domain information storage unit 222. When the controller 210 determines that they match, the wired communication unit 211 transmits an authentication request to the W-LAN authentication server 300 to request authentication of the second access of the radio terminal 100. When permitting the second access in response to the authentication request, the W-LAN authentication server 300 is configured to transmit a permit notification, indicating that the second access is permitted, to the radio terminal 100 via the EV-DO base station 1A. In other words, the wired communication unit 211 functions as a request transmitter configured to transmit an authentication request and as a notification transmitter configured to transmit a permit notification.

(2. 3) Configuration of the W-LAN Authentication Server

Figure 4:
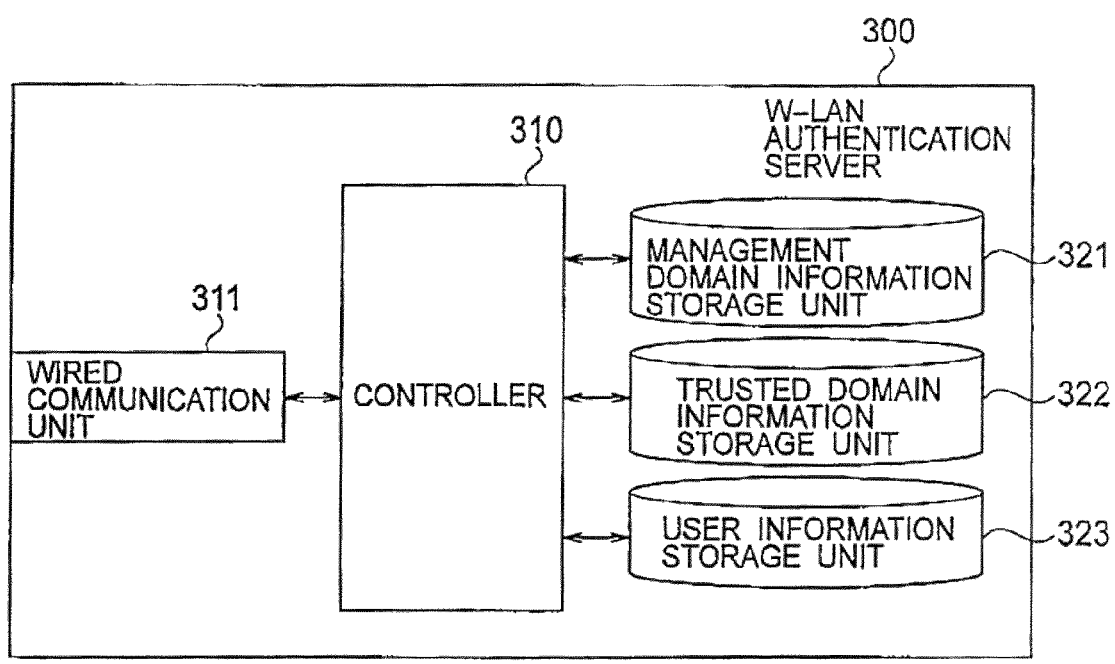
FIG. 4 is a block diagram showing the configuration of a W-LAN authentication server according to the embodiment of the present invention.

FIG. 4 is a block diagram showing the configuration of the W-LAN authentication server 300. Since the W-LAN authentication server 300 has a similar configuration to that of the EV-DO authentication server 200, descriptions of the W-LAN authentication server 300 will be given only for the points that are different from those of the EV-DO authentication server 200.

As shown in FIG. 4, the W-LAN authentication server 300 includes a wired communication unit 311, a controller 310, a management domain information storage unit 321, a trusted domain information storage unit 322, and a user information storage unit 323.

The wired communication unit 311 is connected to the backbone network 2B constituting the W-LAN system 2, and performs wired communication with the W-LAN base station 2A via the backbone network 2B. Further, the wired communication unit 311 performs wired communication with the EV-DO authentication server 200 via the backbone network 2B and the Internet 3.

The management domain information storage unit 321 stores management domain information including the MAC address of the W-LAN base station 2A and the IP address of the W-LAN authentication server 300 in association with each other. The trusted domain information storage unit 322 stores information on the EV-DO system 1 as trusted-domain information. To give a concrete example, the trusted domain information storage unit 322 stores trusted-domain information including the BSID of the base station 1A, information on a service provider providing the EV-DO system 1, and the IP address of the EV-DO authentication server 200 in association with each other. The user information storage unit 323 stores user information including a user identifier identifying a user who can use the W-LAN system 2.

The controller 310 is configured by, for example, a CPU, and controls various functions of the W-LAN authentication server 300. When the wired communication unit 311 receives an authentication request for the radio terminal 100 from the EV-DO authentication server 200, the controller 310 is configured to refer to the user information storage unit 323 to determine whether or not to permit the second access of the radio terminal 100. When determining to permit the second access of the radio terminal 100, the controller 310 is configured to transmit key information (specifically, WEP key) to the EV-DO authentication server 200 and to the W-LAN base station 2A, through the wired communication unit 311. The key information is used for encryption and decryption in radio communication between the radio terminal 100 and the W-LAN base station 2A, and the WEP key is a shared key used in radio communication between the radio terminal 100 and the W-LAN base station 2A.

(3) Operations of the Communication System

Next, the operations of the communication system 10 will be described in order of: (3. 1) Operation of Base Station Identifier Registration, (3. 2) Operation of Base Station Identifier Exchange, and (3. 3) Operation of Handover.

(3. 1) Operation of Base Station Identifier Registration

Figure 5:
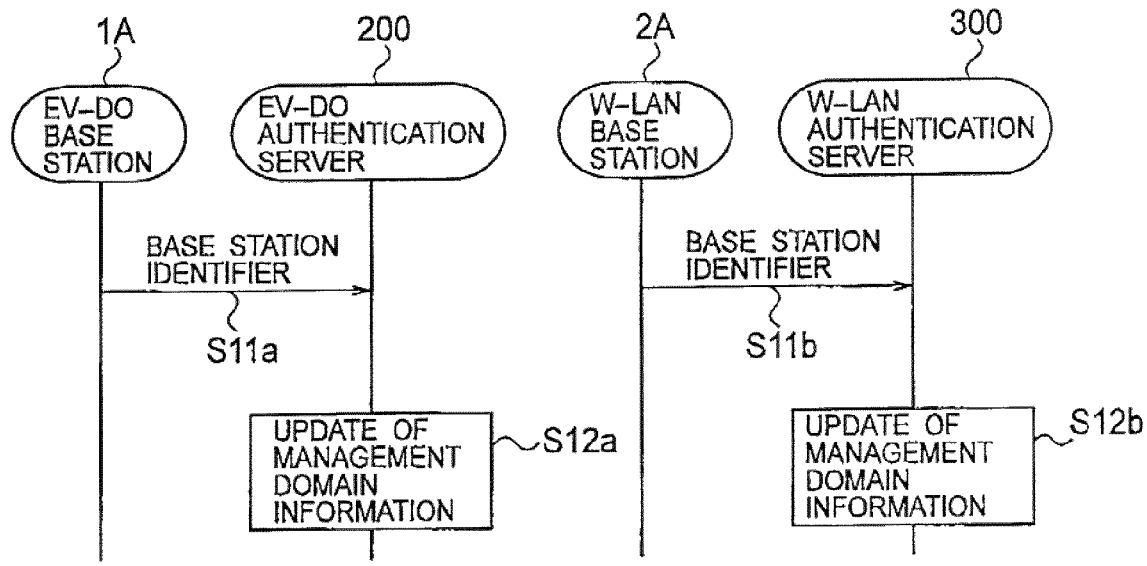
FIG. 5 is a sequence diagram showing an operation of base station identifier registration according to the embodiment of the present invention.

FIG. 5 is a sequence diagram showing an operation of registering a base station identifier of each of the EV-DO base station 1A and the W-LAN base station 2A.

In Step S11a, the EV-DO base station 1A notifies the EV-DO authentication server 200 of the base station identifier (BSID) of the EV-DO base station 1A when, for example, the EV-DO base station 1A is set up or the service is started.

The IP address of the EV-DO authentication server 200 being a notification destination is set in advance in the EV-DO base station 1A by the service provider when the EV-DO base station 1A is set up. Alternatively, the EV-DO authentication server 200 may transmit its IP address periodically by means of a broadcast message to let the EV-DO base station 1A know the IP address of the EV-DO authentication server 200.

In Step S11b, the W-LAN base station 2A notifies the W-LAN authentication server 300 of the base station identifier (MAC address) of the W-LAN base station 2A when, for example, the W-LAN base station 2A is set up or the service is started. The IP address of the W-LAN authentication server 300 being a notification destination is set in advance in the W-LAN base station 2A by the service provider when the W-LAN base station 2A is set up. Alternatively, the W-LAN authentication server 300 may transmit its IP address periodically by means of a broadcast message to let the W-LAN base station 2A know the IP address of the W-LAN authentication server 300.

In Step S12a, the controller 210 of the EV-DO authentication server 200 updates the management domain information by storing the base station identifier (BSID) of the EV-DO base station 1A notified via the wired communication unit 211, in the management domain information storage unit 221. In Step S12b, the controller 310 of the W-LAN authentication server 300 updates the management domain information by storing the base station identifier (MAC address) of the W-LAN base station 2A notified via the wired communication unit 311, in the management domain information storage unit 321. In this way, the controller 210 of the EV-DO authentication server 200 manages the base station identifier (BSID) of the EV-DO base station 1A in the management domain information storage unit 221, and the controller 310 of the W-LAN authentication server 300 manages the base station identifier (MAC address) of the W-LAN base station 2A in the management domain information storage unit 321.

(3. 2) Operation of Exchanging Base Station Identifier

Figure 6:
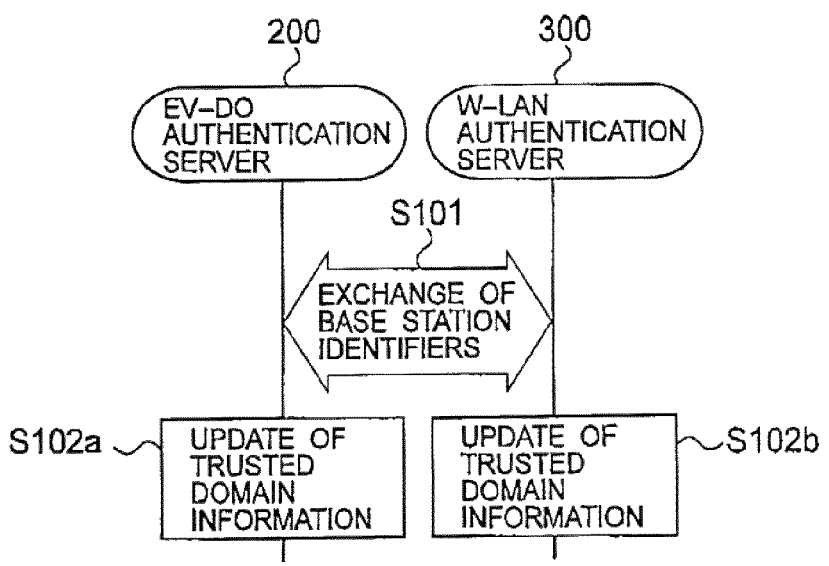
FIG. 6 is a sequence diagram showing an operation of base station identifier exchange according to the embodiment of the present invention.

FIG. 6 is a sequence diagram showing an operation of base station identifier exchange between the EV-DO authentication server 200 and the W-LAN authentication server 300.

In Step S101, the EV-DO authentication server 200 and the W-LAN authentication server 300 exchange their base station identifiers. Specifically, via the wired communication unit 211, the controller 210 of the EV-DO authentication server 200 notifies the W-LAN authentication server 300 of the base station identifier (BSID) of the EV-DO base station 1A stored in the management domain information storage unit 221. Likewise, via the wired communication unit 311, the controller 310 of the W-LAN authentication server 300 notifies the EV-DO authentication server 200 of the base station identifier (MAC address) of the W-LAN base station 2A stored in the management domain information storage unit 321.

In Step S102a, the controller 210 of the EV-DO authentication server 200 stores the base station identifier notified by the W-LAN authentication server 300 via the wired communication unit 211, in the trusted domain information storage unit 222 as trusted-domain information (usable base station identifier). In Step S102b, the controller 310 of the W-LAN authentication server 300 stores the base station identifier notified by the EV-DO authentication server 200 via the wired communication unit 311, in the trusted domain information storage unit 322 as trusted-domain information (usable base station identifier).

In addition, when the base station identifier (BSID) of the EV-DO base station 1A is added to or deleted from the management domain information storage unit 221 of the EV-DO authentication server 200, the controller 210 of the EV-DO authentication server 200 notifies the W-LAN authentication server 300 through the wired communication unit 211, of the added or deleted base station identifier (BSID) of the EV-DO base station 1A. Then, the W-LAN authentication server 300 updates the trusted domain information in the trusted domain information storage unit 322, according to the base station identifier (BSID) notified by the EV-DO authentication server 200 via the wired communication unit 311.

Likewise, when the base station identifier (MAC address) of the W-LAN base station 2A is added to or deleted from the management domain information storage unit 321 of the W-LAN authentication server 300, the controller 310 of the W-LAN authentication server 300 notifies the EV-DO authentication server 200 through the wired communication unit 311, of the added or deleted base station identifier (MAC address) of the W-LAN base station 2A. Then, the EV-DO authentication server 200 updates the trusted domain information in the trusted domain information storage unit 222, according to the base station identifier (MAC address) notified by the W-LAN authentication server 300 via the wired communication unit 211.

As described above, when trusting each other's domains (when setting each other's domains as handover destinations), the EV-DO authentication server 200 and the W-LAN authentication server 300 exchange their managing base station identifiers and store the received base station identifiers. Moreover, when a change occurs in the base station identifiers being managed, each of the EV-DO authentication server 200 and the W-LAN authentication server 300 notifies the other authentication server of that change so that the other authentication server can keep up with the current system configuration.

(3. 3) Operation of Handover

FIG. 7 is a sequence diagram showing an operation of the communication system 10 performed when the radio terminal 100 performs handover.

In Steps S103 to S106, the controller 110 of the radio terminal 100 causes the radio terminal 100 to connect to the EV-DO system 1 through the EV-DO radio communication unit 111, and starts a first access to the Internet 3 via the EV-DO system 1.

In Step S103, authentication processing in the link layer (L2) and the IP layer (L3) is performed between the controller 110 of the radio terminal 100 and the EV-DO base station 1A. In Step S104, via the EV-DO radio communication unit 111, the controller 110 of the radio terminal 100 acquires an IP address used for the first access by using a dynamic host configuration protocol (DHCP) or the like.

In Step S105, authentication processing for the user of the radio terminal 100 is performed between the controller 110 of the radio terminal 100 and the controller 210 of the EV-DO authentication server 200. Specifically, through the EV-DO radio communication unit 111, the controller 110 of the radio terminal 100 notifies the EV-DO authentication server 200 of the name of an ISP (or of a management domain) providing service to the radio terminal 100, and the user identifier of the radio terminal 100. A possible method of notifying the radio terminal 100 of the IP address of the EV-DO authentication server 200 is to set the IP address of the EV-DO authentication server 200 in advance in the storage unit 160 of the radio terminal 100, or to notify the radio terminal 100 of the IP address by using an option in a DHCPACK message transmitted when the IP address is set up. In Step S106, the controller 110 of the radio terminal 100 starts the first access.

In Step S107, the controller 110 of the radio terminal 100 determines to perform handover to another base station because of deterioration of communication quality with the EV-DO base station 1A to which the EV-DO radio communication unit 111 is currently being connected. Here, assume that the W-LAN radio communication unit 112 detects a beacon signal transmitted by the W-LAN base station 2A. In Step S108, the controller 110 of the radio terminal 100 and the W-LAN radio communication unit 112 extract the base station identifier (MAC address) of the W-LAN base station 2A from the beacon signal transmitted by the W-LAN base station 2A.

In Steps S109 and S110, through the EV-DO radio communication unit 111, the controller 110 of the radio terminal 100 notifies the EV-DO authentication server 200 via the EV-DO base station 1A, of the base station identifier (MAC address) of the W-LAN base station 2A acquired in Step S108. At this time, in addition to the base station identifier (MAC address) of the W-LAN base station 2A, the controller 110 of the radio terminal 100 may also make notification of the IP address of the correspondent node 400.

In Step S111, the controller 210 of the EV-DO authentication server 200 compares the base station identifier (MAC address) of the W-LAN base station 2A notified via the wired communication unit 211, with trusted domain information held in the trusted domain information storage unit 222. When the base station identifier (MAC address) is in the trusted domain information held in the trusted domain information storage unit 222, in Step S112, the controller 210 specifies the W-LAN authentication server 300 that corresponds to the base station identifier (MAC address) from the trusted domain information.

Note that the controller 210 of the EV-DO authentication server 200 may notify the radio terminal 100, through the wired communication unit 211, of a fact "trusted" when the base station identifier (MAC address) is in the trusted domain information, and may notify the radio terminal 100, through the wired communication unit 211, of a fact "not trusted" when the base station identifier (MAC address) is not in the trusted domain information. Based on the reply, the controller 110 of the radio terminal 100 can determine whether pre-authenticated handover is possible or not.

In Step S113, the controller 210 of the EV-DO authentication server 200 notifies the W-LAN authentication server 300, through the wired communication unit 211, of an authentication request requesting pre-authentication of the radio terminal 100 (called a "pre-authentication request" below as appropriate). The pre-authentication request includes the name of an ISP (or of a management domain) providing service to the radio terminal 100, the identifier of the user of the radio terminal 100, and the base station identifier (MAC address) of the W-LAN base station 2A. For example, the name of an ISP (or of a management domain) providing service to the radio terminal 100 and the identifier of the user of the radio terminal 100 can be in a format such as "user identifier@ISP," and this format is used in the following as an example. In addition to the pieces of information given above, the pre-authentication request may include the IP address of the correspondent node 400.

In Step S114, based on the user identifier included in the pre-authentication request, the controller 310 of the W-LAN authentication server 300 refers to the user information storage unit 323 to check whether the user of the radio terminal 100 is already registered or not. When the user of the radio terminal 100 is registered as a user, in Step S115, the controller 310 of the W-LAN authentication server 300 refers to the management domain information storage unit 321 to specify the W-LAN base station 2A based on the base station identifier (MAC address) included in the pre-authentication request.

Note that, if the IP address of the correspondent node 400 is notified, in Step S116, the controller 310 of the W-LAN authentication server 300 checks whether it is possible to communicate with the correspondent node 400, by using ping or the like. If it is impossible, the controller 310 of the W-LAN authentication server 300 notifies the radio terminal 100, through the wired communication unit 311, of such fact via the EV-DO authentication server 200. Such processing allows the controller 110 of the radio terminal 100 to check whether to be able to communicate with the correspondent node 400 after handover.

In Step S117, the controller 310 of the W-LAN authentication server 300 refers to the management domain information storage unit 321 and specifies an IP address that corresponds to the base station identifier (MAC address) of the W-LAN base station 2A. Then, through the wired communication unit 311, the controller 310 of the W-LAN authentication server 300 transmits a WEP key to the IP address thus specified. At this time, the controller 310 of the W-LAN authentication server 300 transmits the "user identifier@ISP" along with the WEP key through the wired communication unit 311. Upon receipt of the WEP key and the "user identifier@ISP" from the W-LAN authentication server 300, the W-LAN base station 2A holds the WEP key and the "user identifier@ISP" thus received.

In Step S118, the W-LAN authentication server 300 transmits the WEP key to the EV-DO authentication server 200. In Steps 119 and 120, the EV-DO authentication server 200 transmits the WEP key to the radio terminal 100 via the EV-DO base station 1A. At this time, the EV-DO authentication server 200 also transmits a permit notification indicating that the pre-authentication has succeeded, to the radio terminal 100. Upon receipt of the permit notification, the radio terminal 100 starts procedures for performing handover to the W-LAN base station 2A.

In Step S121, the controller 110 of the radio terminal 100 causes the radio terminal 100 to connect to the W-LAN base station 2A through the W-LAN radio communication unit 112, and notifies the W-LAN base station 2A of the "user identifier@ISP" through the W-LAN radio communication unit 112. The W-LAN base station 2A uses the WEP key corresponding to the "user identifier@ISP" to perform encryption and decryption in further radio communication with the radio terminal 100. Likewise, the controller 110 of the radio terminal 100 uses the WEP key received from the EV-DO authentication server 200 via the EV-DO radio communication unit 111, to perform encryption and decryption in further radio communication between the W-LAN base station 2A and the W-LAN radio communication unit 112.

In Step S122, authentication processing in the link layer (L2) and the IP layer (L3) is performed between the controller 110 of the radio terminal 100 and the W-LAN base station 2A. In Step S123, according to the DHCP or mobile IP, the controller 110 of the radio terminal 100 acquires an IP address used for a second access, via the W-LAN radio communication unit 112. Then, in Step S124, the controller 110 of the radio terminal 100 performs IP-layer handover, and starts the second access to the Internet 3 via the W-LAN base station 2A.

(4) Advantageous Effects

As described above, the EV-DO authentication server 200 transmits an authentication request to the W-LAN authentication server 300 in advance (before the radio terminal 100 performs link-layer handover). When the pre-authentication request is permitted, the EV-DO authentication server 200 notifies the radio terminal 100 that the second access has been permitted by the W-LAN authentication server 300. Then, upon receipt of the permit notification, the radio terminal 100 performs handover to the W-LAN base station 2A, and starts the second access to the Internet 3 via the W-LAN base station 2A.

Accordingly, the second access is already permitted by the W-LAN authentication server 300 when the radio terminal 100 performs link-layer handover (before the radio terminal 100 is connected to the W-LAN system 2). Thereby, the radio terminal 100 can start the second access to the Internet 3 instantly.

In addition, the EV-DO authentication server 200 transmits the pre-authentication request to the W-LAN authentication server 300 after confirming that the W-LAN base station 2A can be used for the second access to the Internet 3. Accordingly, the radio terminal 100 can be guaranteed to maintain the second access to the Internet 3 continuously via a handover destination (the W-LAN base station 2A).

In the present embodiment, when receiving a pre-authentication request from the EV-DO authentication server 200 and then permitting the radio terminal 100 to access the Internet 3, the W-LAN authentication server 300 transmits a WEP key to the EV-DO authentication server 200 and to the W-LAN base station 2A. The WEP key is used for encryption and decryption in radio communication between the radio terminal 100 and the W-LAN base station 2A. Upon receipt of the WEP key from the W-LAN authentication server 300, the EV-DO authentication server 200 transmits a permit notification and the WEP key to the radio terminal 100 via the EV-DO base station 1A. The radio terminal 100 and the W-LAN base station 2A use the WEP key to perform encryption and decryption.

Accordingly, when the radio terminal 100 performs link-layer handover (before connected to the W-LAN system 2), the WEP key is already acquired from the W-LAN authentication server 300. Therefore, the radio terminal 100 and the W-LAN base station 2A can perform communication of encoded packets in a radio link between the radio terminal 100 and the W-LAN base station 2A immediately after the handover.

In the present embodiment, when the quality of radio communication between the radio terminal 100 and the EV-DO base station 1A deteriorates to a value lower than a predetermined threshold, and the radio terminal 100 detects a beacon signal including a base station identifier (MAC address), the radio terminal 100 notifies the EV-DO authentication server 200 of the base station identifier (MAC address). Thus, proper pre-authentication procedures can be started when the radio terminal 100 needs to perform handover.

In the present embodiment, when a usable base station is added or deleted, the trusted domain information storage unit 222 of the EV-DO authentication server 200 stores again the usable identifiers (MAC addresses) identifying the usable base stations after the addition or the deletion. Accordingly, the W-LAN base station 2A permitted by the service provider providing the EV-DO system 1 can be registered promptly.

(5) Other Embodiments

The present invention has been described above based on the embodiment. However, it should be understood that the descriptions and drawings constituting a part of the disclosure does not limit the present invention. The disclosure makes various alternate embodiments, examples, and operation techniques apparent to those skilled in the art.

For example, in the above embodiment, a case where the radio terminal 100 performs handover from the EV-DO system 1 to the W-LAN system 2 has been described. However, the present invention is also applicable to a case where the radio terminal 100 performs handover from the W-LAN system 2 to the EV-DO system 1. Further, the present invention is not limited to handover between the EV-DO system 1 and the W-LAN system 2. As long as handover is performed between management domains managed by different authentication servers, handover may be performed between management domains employing the same radio communication scheme or between management domains managed by the same service provider.

As described, it should be understood that the present invention includes various embodiments and the like which are not described herein. Therefore, the present invention should be limited only by the specified matters in the present invention defined by the claims reasonably understood from this disclosure.

What is claimed is:

1. A communication system comprising:
a radio terminal configured to perform handover from a first radio base station to a second radio base station;
a first authentication server configured to perform authentication of a first access to a communication network via the first radio base station; and
a second authentication server configured to perform authentication of a second access to the communication network via the second radio base station, wherein
upon detection of a radio signal including a base station identifier identifying the second radio base station during the first access, the radio terminal notifies the first authentication server of the base station identifier, and
the first authentication server includes:
a storage unit configured to store a usable base station identifier identifying a usable base station which is a radio base station usable by the radio terminal to access the communication network;
a request transmitter configured to transmit, to the second authentication server, an authentication request requesting authentication of the second access of the radio terminal, when the base station identifier notified by the radio terminal matches the usable base station identifier stored by the storage unit; and
a notification transmitter configured to transmit, to the radio terminal via the first radio base station, a permit notification indicating that the second access is permitted, when the second authentication server permits the second access of the radio terminal in response to the authentication request, wherein
upon receipt of the permit notification, the radio terminal performs the handover to the second radio base station and starts the second access.

2. The communication system according to claim 1, wherein
the second authentication server transmits, to the first authentication server and the second radio base station, key information used for encryption and decryption in radio communication between the radio terminal and the second radio base station, when the second authentication server receives the authentication request from the first authentication server and permits the second access of the radio terminal,
the first authentication server transmits the permit notification and the key information to the radio terminal via the first radio base station, when the first authentication server receives the key information from the second authentication server, and
the radio terminal and the second radio base station use the key information to perform the encryption and the decryption.

3. The communication system according to claim 1, wherein
the radio terminal transmits the base station identifier to the first authentication server when communication quality of radio communication between the radio terminal and the first radio base station has deteriorated to a value lower than a predetermined threshold and when the radio terminal detects the radio signal including the base station identifier.

4. The communication system according to claim 1, wherein
when the usable base station is added or deleted, the storage unit stores again usable base station identifiers identifying usable base stations after the addition or the deletion.

5. The communication system according to claim 1, wherein
the first radio base station is included in a first radio communication system provided by a predetermined service provider, and
the second radio base station is included in a second radio communication system provided by a service provider different from the predetermined service provider.

6. The communication system according to claim 5, wherein
the first radio communication system is configured in conformity with a predetermined radio communication scheme, and
the second radio communication system is configured in conformity with a radio communication scheme different from the predetermined radio communication scheme.

7. An authentication server configured to perform authentication of a first access to a communication network via a first radio base station, the authentication server comprising:
a storage unit configured to store a usable base station identifier identifying a usable base station which is a radio base station usable by a radio terminal to access the communication network, the radio terminal performing handover from the first radio base station;
a request transmitter configured to transmit an authentication request to a different authentication server managing a second radio base station, when a base station identifier identifying the second radio base station notified by the radio terminal as a handover candidate matches the usable base station identifier stored by the storage unit, the authentication request requesting authentication of a second access to the communication network via the second radio base station; and
a notification transmitter configured to transmit a permit notification to the radio terminal via the first radio base station, when the different authentication server permits the second access of the radio terminal in response to the authentication request, the permit notification indicating that the second access is permitted.

8. A communication method used for a communication system including: a radio terminal configured to perform handover from a first radio base station to a second radio base station; a first authentication server configured to perform authentication of a first access to a communication network via the first radio base station; and a second authentication server configured to perform authentication of a second access to the communication network via the second radio base station, the method comprising the steps of:
storing, at the first authentication server, a usable base station identifier identifying a usable base station which is a radio base station usable by the radio terminal to access the communication network;
notifying, at the radio terminal, the first authentication server of a base station identifier upon detection of a radio signal including the base station identifier identifying the second radio base station during the first access;
transmitting, at the first authentication server, an authentication request to the second authentication server when the base station identifier notified by the step of notifying matches the usable base station identifier stored by the step of storing, the authentication request requesting authentication of the second access of the radio terminal; transmitting, at the first authentication server, a permit notification to the radio terminal via the first radio base station when the second authentication server permits the second access of the radio terminal in response to the authentication request, the permit notification indicating that the second access is permitted; and performing, at the radio terminal, handover to the second radio base station upon receipt of the permit notification and starting the second access.

\* \* \* \* \*